United States Patent
Sharma et al.

(10) Patent No.: US 10,255,817 B2
(45) Date of Patent: Apr. 9, 2019

(54) COMPUTER IMPLEMENTED SYSTEM AND METHOD FOR PROVIDING ROBUST COMMUNICATION LINKS TO UNMANNED AERIAL VEHICLES

(71) Applicant: Tata Consultancy Services Limited, Mumbai (IN)

(72) Inventors: Hrishikesh Sharma, Bangalore (IN); Samar Shailendra, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/022,512

(22) PCT Filed: Jan. 30, 2015

(86) PCT No.: PCT/IB2015/050698
§ 371 (c)(1),
(2) Date: Mar. 16, 2016

(87) PCT Pub. No.: WO2015/114572
PCT Pub. Date: Aug. 6, 2015

(65) Prior Publication Data
US 2016/0328980 A1 Nov. 10, 2016

(30) Foreign Application Priority Data
Jan. 31, 2014 (IN) .......................... 351/MUM/2014

(51) Int. Cl.
*G08G 5/00* (2006.01)
*B64C 39/02* (2006.01)
*G05D 1/00* (2006.01)

(52) U.S. Cl.
CPC .......... *G08G 5/0069* (2013.01); *B64C 39/024* (2013.01); *G05D 1/0022* (2013.01); *G08G 5/0013* (2013.01); *G08G 5/0056* (2013.01)

(58) Field of Classification Search
CPC .... G08G 5/0069; G08G 5/0095; G08G 5/025; G08G 5/0013; G08G 5/00; B64C 9/024; G05D 1/0022; G05D 1/0044
See application file for complete search history.

(56) References Cited

U.S. PATENT DOCUMENTS 6,868,314 B1 * 3/2005 Frink ..................... B64C 1/00
244/119
7,158,872 B2 1/2007 DeVore et al.
(Continued)

FOREIGN PATENT DOCUMENTS

WO WO 2009/006632 1/2009

OTHER PUBLICATIONS

English-language International Search Report from the U.S. Patent Office, dated Jun. 15. 2015, for International Application No. PCT/IB2015/050698.

*Primary Examiner* — Jerrah Edwards
*Assistant Examiner* — Mathew Franklin Gordon
(74) *Attorney, Agent, or Firm* — Finnegan, Henderson, Farabow, Garrett & Dunner LLP

(57) ABSTRACT

A computer implemented system for providing robust communication links to unmanned aerial vehicles is envisaged. It comprises a plurality of nodes which communicate with each other and with an unmanned aerial vehicle to allow exchange of data. A 3D signal coverage model is created which determines signal coverage provided by the plurality of nodes. A navigator present in the system navigates the unmanned aerial vehicle to follow a stored flight path based on this 3D model. Waypoints present in the path of the unmanned aerial vehicle are then identified and suitable (Continued)

waypoints are selected from where sensed pre-stored data is collected. A suitable node is then selected based on the stored 3D signal coverage model, location of the unmanned aerial vehicle and the nodes, and the signal strength of the nodes and the collected data is transmitted to the suitable node through the unmanned aerial vehicle to provide robust communication.

14 Claims, 4 Drawing Sheets

(56) References Cited

U.S. PATENT DOCUMENTS

| | | | | |
|---|---|---|---|---|
| 2004/0249519 | A1* | 12/2004 | Frink | B64D 45/0015 |
| | | | | 701/3 |
| 2012/0158237 | A1* | 6/2012 | Lee | G05D 1/0274 |
| | | | | 701/26 |
| 2012/0293678 | A1* | 11/2012 | Amor Molares | H04N 5/772 |
| | | | | 348/222.1 |
| 2013/0174223 | A1* | 7/2013 | Dykeman | G06F 21/10 |
| | | | | 726/4 |
| 2014/0025236 | A1 | 1/2014 | Levien et al. | |
| 2014/0032034 | A1* | 1/2014 | Raptopoulos | G08G 5/0069 |
| | | | | 701/25 |

\* cited by examiner

COMPUTER IMPLEMENTED SYSTEM AND METHOD FOR PROVIDING ROBUST COMMUNICATION LINKS TO UNMANNED AERIAL VEHICLES

FIELD OF DISCLOSURE

The present disclosure relates to the field of Radio Frequency (RF) communication in Unmanned Aerial Systems (UASs).

DEFINITIONS OF TERMS USED IN THE SPECIFICATION

The expression 'entity' used hereinafter in this specification refers to an object of material existence which requires UAV monitoring.

The expression 'coverage skimming' used hereinafter in this specification refers to skimming through areas of coverage that interleave through the regions of sensing targets as well as through regions of signal coverage.

BACKGROUND

As a result of advancements in computer vision and wireless technology, Unmanned Aerial Systems (UAS) were typically used in special applications such as security works. But, with the availability of mini-unmanned aerial vehicles (UAV) and micro-UAVs in the market now, which are cheaper yet robust, UASs are being used in civilian applications which involve transmission of telemetry and multimedia data to the Ground Control Station (GCS).

The use of Unmanned Aerial Systems (UAS) for sensing applications is an upcoming technology. These applications involve remote sensing typically in outdoor areas. Most of these applications involve surveillance for monitoring of vast infrastructures that at times also run through harsh and uninhabitable terrains. Besides flight regulation, wireless communication is an important aspect of a UAS. It is essential to communicate between a UAS and a GCS wirelessly as telemetry information (navigation, control and guidance) and at times, sensor data is required to be transmitted to a ground based mission control center in near real-time. Traditional UASs take care of such communication by using proprietary communication systems. The available technology options are limited in the case of long range communications. It is difficult to construct multiple radio signal transmission towers inside harsh and uninhabitable terrains. Hence for communication between a transceiver on-board a UAS and a radio transceiver, the transceiver is almost always installed at the boundary of a habited place. The ground based transceiver may be part of Ground Control Station, or may have to relay the communication further to GCS. However, for such a topology or setup, it is difficult to have radio signal coverage deep inside such terrains, due to phenomena of diffraction, absorption, polarization and scattering, which result in (Rayleigh) signal fading. Additionally, it is difficult to plan a flight path that can factor maximal coverage availability in remote and non-urban places.

Moreover, for surveillance, especially in case of emergency breakdown of some infrastructural system, it is important to have connectivity for as long time as possible, during an operational flight of a UAS. This is to allow the sensed data to be sent to GCS in real time. Practical UAS applications do not have on-board sensor signal processing facility since that will curtail the flight duration. Also, even if the UAV is flight autonomous, for a secondary control mechanism in the case of UAS failure, real-time connectivity for telemetry is still needed. The operational flight using a mini-UAV typically lasts for an hour and covers tens of kilometers inside any region.

Thus, it is evident that aforementioned current methods of connectivity typically involving direct RF line-of-sight communication between a GCS and a UAS are limited in terms of distance/time till which they can ensure connectivity. Hence, there is a need for a system that provides connectivity between a UAV and a GCS for maximum period during the UAV flight.

OBJECTS

An object of the system of the present disclosure is to provide a communication subsystem that enhances the duration of connectivity between a UAV and a GCS during a UAV flight.

Another object of the system of the present disclosure is to provide a system that uses available public cellular networks as one of the communication modes to provide high coverage along the flight path of a UAV.

Still another object of the system of the present disclosure is to provide a system that can modify a UAV's flight path for coverage skimming.

One more object of the system of the present disclosure is to provide a method that increases the size/number of signal coverage regions.

Yet another object of the system of the present disclosure is to provide a method for improving the average packet loss ratio.

An additional object of the system of the present disclosure is to provide a system that effectively utilizes the period of connectivity between a UAV and a GCS.

One more object of the system of the present disclosure is to provide a system that creates a 3D signal coverage model that can be used during off-line path planning.

Other objects and advantages of the present disclosure will be more apparent from the following description when read in conjunction with the accompanying figures, which are not intended to limit the scope of the present disclosure.

SUMMARY

The present disclosure envisages a computer implemented system for providing robust communication links to unmanned aerial vehicles.

Typically, in accordance with the present disclosure, the system for providing robust communication links to unmanned aerial vehicles comprises a plurality of nodes configured to communicate with each other and with an unmanned aerial vehicle to allow exchange of data. A signal coverage model creator present in the system is configured to create a 3D model determining signal coverage provided by the plurality of nodes in a pre-determined area. This signal coverage model creator comprises a 3D grid creator, a node identifier, an interpolator and a model creator. The 3D grid creator is configured to create a 3D grid based on predetermined set of rules covering the pre-determined area. The node identifier cooperates with the plurality of nodes and the 3D grid creator and is configured to identify immediate neighbor nodes of each of plurality of nodes present in the area covered by the 3D grid to obtain location information of the immediate neighbor nodes. The interpolator cooperates with the node identifier to receive the location information of the identified immediate neighbor nodes and is configured to identify distance between the immediate neighbor nodes to interpolate approximate signal strength of the identified nodes based on the identified distance. The model creator then cooperates with the node identifier and the interpolator and is configured to create a 3D signal coverage model including location information and approximate signal strength of the identified nodes. A repository present in the system cooperates with the signal coverage model creator and is configured to store the 3D signal coverage model for the pre-determined area, and is also configured to store, for the unmanned aerial vehicle, a pre-determined flight path having pre-determined corridors on each side of the flight path and information associated with the flight path. This information comprises location information related to waypoints lying within the corridors. A navigator present in the system cooperates with the repository to receive the stored flight path and the stored 3D coverage model, and is configured to navigate the unmanned aerial vehicle to follow the stored flight path. A waypoint identifier then cooperates with the navigator and is configured to identify waypoints present in the followed flight path, wherein the identified waypoints include suitable waypoints and guiding waypoints. A waypoint selector cooperates with this waypoint identifier and selects the suitable waypoints from the identified waypoints. A data collector cooperating with the waypoint selector and the unmanned aerial vehicle, then collects data from the selected suitable waypoints present in the flight path. A location identifier present in the system cooperates with the navigator and the repository and is configured to identify location of the unmanned aerial vehicle and determine nodes present at pre-determined distance from the unmanned aerial vehicle based on the stored 3D signal coverage model and the stored approximate signal strengths. A signal strength detector then cooperates with the location identifier and detects actual signal strengths of the determined nodes. A node selector present in the system cooperates with the location identifier, and the signal strength detector to receive detected actual signal strengths of the determined nodes, and is configured to select from the determined nodes, a suitable node based on corresponding signal strength. A communicator then cooperates with this data collector to receive the collected data from the suitable waypoints and is configured to transmit the collected data to the suitable node through the unmanned aerial vehicle thereby providing robust communication.

In accordance with the present disclosure, there is provided a computer implemented method for providing robust communication links to unmanned aerial vehicles, the method comprises the following:

creating a 3D model determining signal coverage provided by a plurality of nodes in a pre-determined area, the step of creating a 3D model comprising the following:

creating a 3D grid covering the pre-determined area based on predetermined set of rules;

identifying immediate neighbor nodes of each of plurality of nodes present in the area covered by created 3D grid and obtaining location information of the immediate neighbor nodes;

identifying distance between the identified immediate neighbor nodes and interpolating approximate signal strength of the identified nodes based on the identified distance; and creating a 3D signal coverage model including location information and approximate signal strength of the identified nodes;

storing the 3D signal coverage model for the pre-determined area, and also storing, for an unmanned aerial vehicle, a pre-determined flight path having pre-determined corridors on each side of the flight path and information associated with the flight path, wherein the information comprises location information related to waypoints lying within the corridors and signal strengths of the waypoints;

navigating the unmanned aerial vehicle to follow the stored flight path;

identifying waypoints present in the followed flight path, wherein the identified waypoints include suitable waypoints and guiding waypoints;

selecting suitable waypoints from the identified waypoints;

collecting data from the selected suitable waypoints present in the flight path;

identifying location of the unmanned aerial vehicle and determining nodes present at pre-determined distance from the unmanned aerial vehicle based on stored 3D signal coverage model and stored approximate signal strengths;

detecting actual signal strengths of the determined nodes;

selecting, from the determined nodes, a suitable node based on corresponding signal strength; and transmitting the collected data to the suitable node through the unmanned aerial vehicle thereby providing robust communication.

BRIEF DESCRIPTION OF ACCOMPANYING DRAWING

A computer implemented system and method for providing robust communication link to unmanned aerial vehicles will now be explained in relation to the non-limiting accompanying drawings, in which.

DETAILED DESCRIPTION OF THE ACCOMPANYING DRAWINGS

Figure 1:
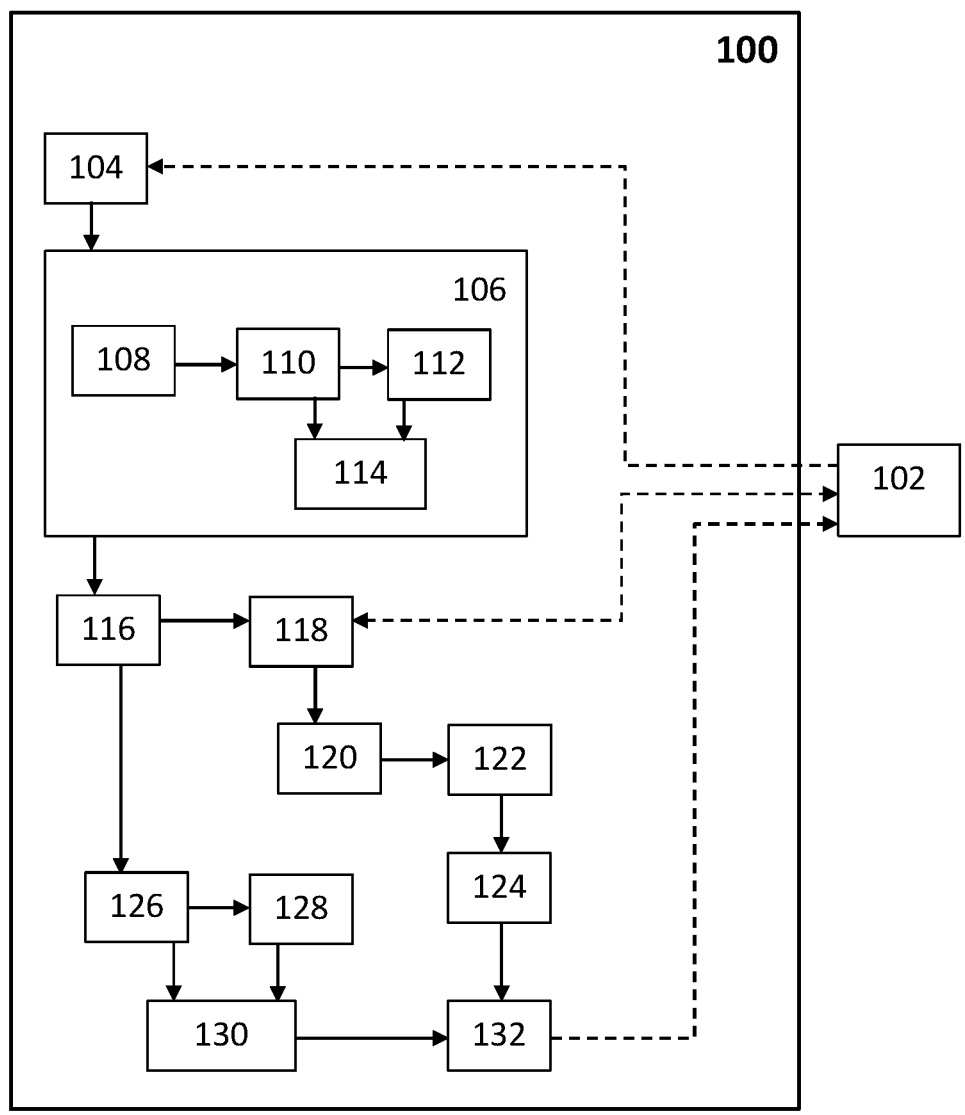
FIG. 1 illustrates a schematic of an embodiment of the computer implemented system that provides robust communication links to unmanned aerial vehicles.

The system of the present disclosure will now be described with reference to the embodiment shown in the accompanying drawing. The embodiment does not limit the scope and ambit of the disclosure. The description relates purely to the examples and preferred embodiments of the disclosed system and its suggested applications.

The system herein and the various features and advantageous details thereof are explained with reference to the non-limiting embodiments in the following description. Descriptions of well-known parameters and processing techniques are omitted so as to not unnecessarily obscure the embodiment herein. The examples used herein are intended merely to facilitate an understanding of ways in which the embodiment herein may be practiced and to further enable those of skill in the art to practice the embodiment herein.

Accordingly, the examples should not be construed as limiting the scope of the embodiment herein.

In accordance with the present disclosure, the system provides robust communication links to unmanned aerial vehicles (UAVs). The first part of this approach involves seamless usage of multiple radio bearers. Generally analog Frequency Modulation (FM) is used via satellite communication to achieve a large coverage area. But, it is a costly technique and is typically used only for security UAS communications. Using multiple radio bearers reduces the cost involved as radio from public cellular networks can also be utilized. Public cellular networks have the advantage of high coverage, available frequencies, low effort and expenses, and existing interfaces to other networks. In case of multiple concurrent coverages, using multiple radio bearers can lead to bandwidth aggregation which proves to be a desired requirement. This leads to simultaneous transmission on multiple connections.

Another approach of the system of present disclosure is to use a computer implemented simulator which may be used in on-line or off-line mode. The off-line mode uses a digital terrain model (DTM) and locations of various radio signal transmitters to model and predict signal propagation losses. The DTM are then overlaid with predicted signal strength areas and a flight plan with various targets as waypoints are evolved. The flight plan skims through areas of coverage, that is, it interleaves through not just the regions of sensing targets, but regions of signal coverage. In the on-line mode, a sequence of received signal strength measurements is used along with the DTM and the locations of transmitters in order to model and predict signal propagation losses more precisely. Based on such predictions, the flight plan is modified to improve the amount of connectivity time. The model used for the prediction is a 3D model that receives signal strength as a sequence of numbers over time, as measured by the on-board computer and the UAS motion vector, and in turn predicts propagation loss of the recent sample of signal strength along various directions (e.g. every 10 degree rotation in 3D space). Such prediction of signal strength in a 3D neighboring region helps in creating a 3D model of signal strength which is known as a 3D signal coverage model. Based on the predictions of this 3D coverage model, only slight modification in the flight path is permitted as there are 3D constraints of the corridor in which the targets/waypoints lie and also the battery power is limited on-board to allow any significant deviation from targets.

Depending on the amount of on-board sensed data storage, the UAV can be periodically made to detour into regions of coverage that lie in the vicinity but not necessarily along the pre-designed flight path. Such approach can achieve more frequent connectivity restoration and real-time transmission of sensed data. If detours are not possible, then the UAV is made to choose and move along another pre-programmed flight path having better coverage probability.

In one embodiment of the system of present disclosure, the system designs a link between a GCS and a UAV using appropriate frequencies. If the range of a communication link so designed does not suffice, another option is to create a dynamic relay network. The system of the present disclosure proposes usage of aerostats, blimps and observation tower-mounted repeaters to provide a better communication link than the use of relay networks. These repeaters do not require much energy since they do not have to relay high average traffic volumes. Hence they can be powered using solar batteries as well. If the density of regions having radio coverage increases, the amount of detour that would be needed decreases. To improve the average packet loss ratio, the system of the present disclosure uses a packet erasure correction technique. A substandard surveillance can be also be provided by the system of present disclosure by dropping certain segments of flight path.

Figure 3:
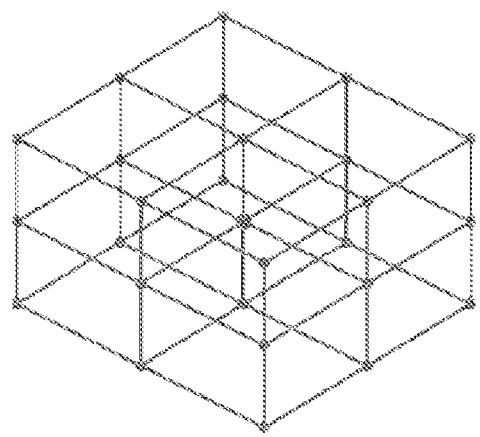
FIG. 3 illustrates an embodiment of a 3D grid.

Referring to the accompanying drawings, FIG. 1 illustrates a schematic of an embodiment of the computer implemented system that provides robust communication links to unmanned aerial vehicles. The system 100 comprises a plurality of nodes 104 which are adapted to communicate with each other and also with an unmanned aerial vehicle (UAV) 102 to allow exchange of data. The unmanned aerial vehicle 102 collects sensed data from various pre-determined targets/waypoints present in its flight path and transmits the collected data to the nodes based on the signal strength and distance of the nodes in order to provide efficient coverage. The waypoints are the target points that store sensed information related to entities which need to be monitored by UAVs. This sensed data includes images and sensed/measured information related to the entities. The system 100 comprises a signal coverage model creator which creates a 3D model determining signal coverage provided by the plurality of nodes 104 in a pre-determined area. The signal coverage model creator 106 comprises a 3D grid creator 108, a node identifier 110, an interpolator 112 and a model creator 114. The grid creator 108 is configured to create a 3D grid based on predetermined set of rules. This 3D grid covers the pre-determined area. The node identifier 110 identifies immediate neighbor nodes of each of plurality of nodes 104 present in the area covered by the 3D grid to obtain location information of the immediate neighbor nodes. The interpolator 112 then identifies distance between the immediate neighbor nodes and interpolates approximate signal strength of the identified nodes based on the identified distance. The model creator 114 cooperates with the node identifier 110 and the interpolator 112 to create a 3D signal coverage model including location information and approximate signal strength of the identified nodes. Referring to the accompanying drawings FIG. 3 illustrates an embodiment of a 3D grid. As illustrated in FIG. 3 there are maximum 26 nodes that are immediate neighbors of a node at the center. If the grid point is under consideration and each of the neighboring grid points are connected via a line, 26 directions are obtained. In these nodes measurements are available directly due to sampling for some nodes. However, for other nodes, due to sparse signal strength measurement on the grid, measurements may not be available on each of the immediate (that is, unit distance apart) nodes. In such a case, $\alpha$-neighborhood is defined, where nodes can be along each of the 26 neighboring direction, at maximum $\alpha$ units of distance away on the corresponding direction from the node under consideration. This neighborhood contains as many as $((2\cdot\alpha+1)^3-1)$ nodes. $\alpha$ is a parameter that can be decided empirically. In the $\alpha$-neighborhood, in certain directions, no measurement may be available. In this case, the interpolator carries out interpolation with as many $(<((2\cdot\alpha+1)^3-1))$ measurements only, as are available within the neighborhood. From the logarithmic base measurement (in decibels) of received power from Friis equation given below:

$$P_R = P_T + G_T + G_R + 20\cdot\beta\cdot\log_{10}\left(\frac{\lambda}{4\pi R}\right)$$

it is observed that the only $$20\cdot\beta\cdot\log_{10}\left(\frac{\lambda}{4\pi R}\right)$$

is a variable term. In this term, path loss coefficient β is a known constant in an area. Even further, when the carrier frequency is fixed, λ is fixed. In such case, the only term that is variable is the transmitter-receiver distance, i.e. R. Thus, the distance is predicted via interpolation.

Referring to FIG. 1, the system 100 comprises a repository 116 that cooperates with the signal coverage model creator 106 and stores the 3D signal coverage model for the pre-determined area. The repository 116 also stores for the unmanned aerial vehicle 102, a pre-determined flight path having pre-determined corridors on each side of the flight path and information associated with the flight path. This stored information comprises location information related to waypoints lying within the corridors and signal strengths of the waypoints. A navigator 118 present in the system receives the stored flight path and the stored 3D coverage model from the repository 116 and navigates the unmanned aerial vehicle 102 to follow the stored flight path. A waypoint identifier 120 cooperates with the navigator 118 and identifies waypoints present in the flight path that is followed by the unmanned aerial vehicle 102. These identified waypoints include suitable waypoints and guiding waypoints. The suitable waypoints are those waypoints which store sensed data which has to be collected by the unmanned aerial vehicle 102 and the guiding waypoints are the waypoints that guide the unmanned aerial vehicle 102 when it is following the flight path. These guiding waypoints act as landmarks along the flight path. Based on the identified waypoints, a waypoint selector 122 selects the suitable waypoints. The waypoint selector 122 checks the identified waypoints to select only those waypoints as suitable waypoints that have stored sensed data. A data collector 124 then collects data from these selected suitable waypoints present in the flight path of the unmanned aerial vehicle 102. The system 100 comprises a location identifier 126 that cooperates with the navigator 118 and the repository 116 and identifies location of the unmanned aerial vehicle 102 and determines nodes present at pre-determined distance from the unmanned aerial vehicle 102 based on stored 3D signal coverage model and stored approximate signal strengths. A signal strength detector 128 then detects actual signal strengths of the determined nodes. Based on the actual signal strength, the stored approximate signal strength, location of suitable waypoints and the location of the unmanned aerial vehicle 102, a node selector 130 selects a suitable node from the determined nodes. A communicator 132 present in the system 100 then cooperates with the data collector 124 to receive the collected data from the suitable waypoints and transmits the collected data to the suitable node selected by the node selector 130 through the unmanned aerial vehicle 102 thereby providing robust communication.

In the communication setup of the system of the present disclosure, for an on-board transmitter, there are typically multiple carriers available from multiple base stations at a given node. The transceiver uses measurement of signal strengths (exact or predicted) from all base stations, and can choose the best channel available/handover.

In one embodiment, when exact location of base stations (nodes) is known/provided and location of all (carrier signal) sources is known, the system of the present disclosure, rather than trying to approximate the signal strength by interpolation, at any grid location, calculates the signal strength expected to be available. This is possible as the location of both transmitter and receiver is known for each base station. To obtain this, Friis equation is evaluated for each base station and once all expected values of base station carriers are known the path for flight is planned accordingly.

Figure 4:
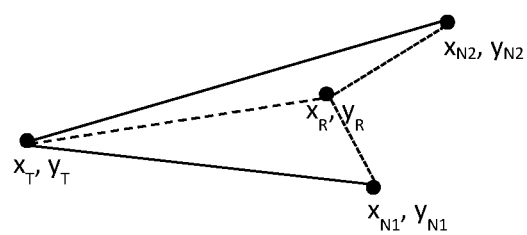
FIG. 4 illustrates a 2-D scenario for predicting distance of a node $(X_R, Y_R)$ from a node $(X_T, Y_T)$.

In another embodiment, when only one source of carrier signal is present at ground and its location is known, the exact signal strength expected to be available at any grid node can be calculated. If this is not possible, the signal strength is predicted. To predict the coverage at one node, interpolation is carried out and the distance of the grid point from the single source is predicted by knowing the (exact) distance of up to 26 grid points in its α-neighborhood as explained earlier. A 2-D scenario of trying to predict the distance of a node $(X_R, Y_R)$ from a node $(X_T, Y_T)$ via using distance measurements of two nodes in its neighborhood $(X_{N1}, Y_{N1})$ and $(X_{N1}, Y_{N2})$ is depicted in FIG. 4 of the accompanying drawings. For small values of a, the distance of $(X_R, Y_R)$ will be close to distances of those neighbors, which are closer to it (e.g. within 1-neighborhood), than others. Considering this, distance-weighted mean to predict the distance between $(X_T, Y_T)$ and $(X_R, Y_R)$ is used. Let the distance between any node (x, y, z) from $(X_T, Y_T, Z_T)$ be $D_{\{x, y, z\}}$. Similarly, let the distance between any node (x, y, z) from $(X_R, Y_R, Z_R)$ be $d_{\{x, y, z\}}$. Then, the predicted value of $D_{xR, yR, zR}$, from β measurement nodes in its α-neighborhood is $$D_{x_R, y_R, z_R} = \frac{\sum_\beta w_{x,y,z} \cdot D_{x,y,z}}{\sum_\beta w_{x,y,z}}$$

where, $$w_{x,y,z} = \frac{1}{\left(\sum_{(x,y,z)} d_{(x,y,z)}\right) - d_{(x,y,z)}}$$

Figure 5:
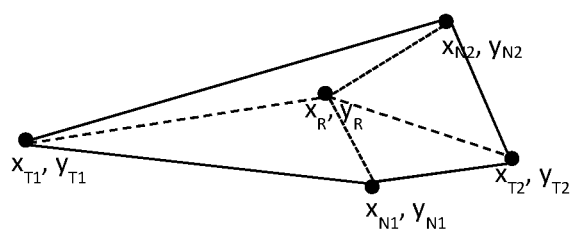
FIG. 5 illustrates a 2-D scenario for predicting a superimposed signal power at a node $(X_R, Y_R)$ as received from sources $(x_{T1}, y_{T1})$ and $(x_{T2}, y_{T2})$.

In yet another embodiment, a multi-user MIMO scenario is considered. One of the advantages of multi-user MIMO over single-user MIMO is that the increased channel capacity can be leveraged for transmitting aerial sensed data at high bit-rate. The receiving antennas in this case are spatially distributed and located at places which have good degree of clearance, so as to have near-line-of-sight communication with UAV most of the while. The on-board transmitter, in this embodiment acts on superimposed signal strength from multiple sources. Hence, the output of signal strength prediction in such case, at a node, is that of superimposed signal strength from various sources only. A 2-D scenario for predicting the superimposed signal power at a node $(X_R, Y_R)$ as received from sources $(x_{T1}, y_{T1})$ and $(x_{T1}, and y_{T2})$, via using superimposed measurements of two nodes in its neighborhood, $(x_{N1}, y_{N1})$ and $(x_{N2}, y_{N2})$ is depicted in FIG. 5 of the accompanying drawings. In this embodiment, if the location of all the (γ) receivers is known, the superimposed signal strength expected to be available at any grid node can be exactly calculated. As it is superimposed power, rather than predicting the distance, inverse of the distance is predicted. A notion of representative distance of a node is defined based on $$P_R \propto \frac{1}{D^2}.$$

The representative distance of a node from multiple sources is defined as:

$$RD_{x,y,z} = \sqrt{\sum_{1<<\gamma} \frac{1}{\frac{1}{(x-x_{T_1})^2 + (y-y_{T_1})^2 + (z-z_{T_1})^2}}}$$

Using this, via distance-weighted average from β neighbors, the representative distance predicted at $(X_R, Y_R, Z_R)$ is $$RD_{x_R, y_R, z_R} = \frac{\sum_\beta w_{x,y,z} \cdot RD_{x,y,z}}{\sum_\beta w_{x,y,z}}$$

where, $$w_{x,y,z} = \frac{1}{\left(\sum_{(x,y,z)} d_{(x,y,z)}\right) - d_{(x,y,z)}}$$

Figure 2:
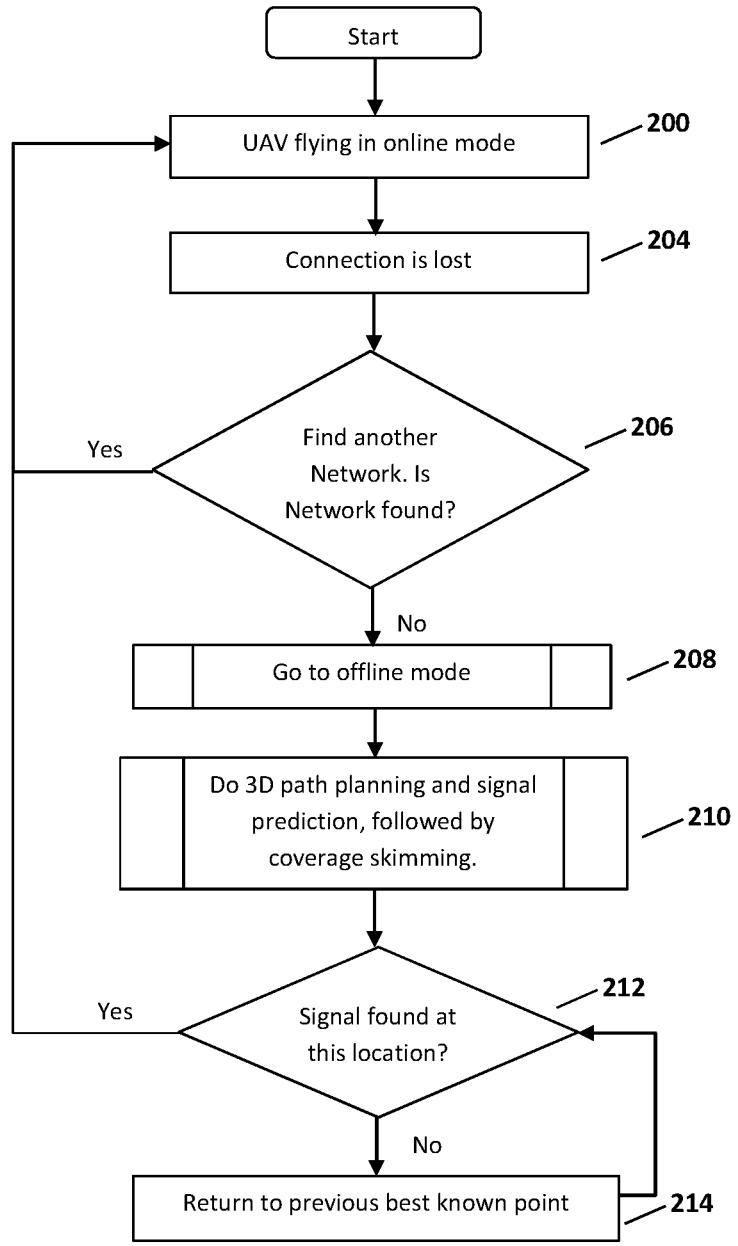
FIG. 2 illustrates the system flow for modifying a UAV's flight path based on coverage skimming.

Referring to the accompanying drawing, FIG. 2 illustrates the system flow for modifying UAVs flight path based on coverage skimming. According to the system of present disclosure a UAV can be operated in two modes viz. online mode and offline mode. In one embodiment of the present disclosure we consider the UAV to be flying in online mode 200. During the flight path of UAV if the connection is lost 204, UAV tries to find another network in its path that provide better connection 206. If the network is found, UAV continues to follow the path in online mode 200, whereas if the connection is lost, the UAV switches to an offline mode 208. In the offline mode, the UAV carries out 3D path planning and signal prediction based on 3D modeling and also uses coverage skimming 210. After the completion of this step, the UAV checks if a signal is found 212. If expected signal is received, the UAV switches into online mode and continues its flight. If the signal is not found on the current location of UAV, it returns to the previous best known location 214 where the signal was received earlier and continues to search for the signal.

TECHNICAL ADVANCEMENTS

A computer implemented system and method for robust communication link to UASs in accordance with the present disclosure described herein above has several technical advancements including but not limited to the realization of:
- a system that enhances the duration of connectivity between a UAS and a GCS during the UAS flight;
- a system that uses available public cellular networks as one of the communication modes to provide high coverage along the flight path of a UAS;
- a system that can modify UAS's flight path to achieve more frequent connectivity;
- a system that provides coverage skimming;
- a system that increases the size/number of signal coverage regions;
- a system that improves the average packet loss ratio;
- a system that effectively utilizes the period of connectivity between a UAS and a GCS;
- a system that controls the rate of generation of source information;
- a system that involves deployment and usage of repeaters in vast and challenging terrains to enhance network coverage in remote areas; and
- a system that creates a 3D signal coverage model that can be used during off-line path planning.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented system for providing robust communication links to unmanned aerial vehicles, said system comprising:
   a plurality of nodes configured to communicate with each other and with an unmanned aerial vehicle to allow exchange of data;
   signal coverage model creator configured to create a 3D model determining signal coverage provided by said plurality of nodes in a pre-determined area;
   a repository cooperating with said signal coverage model creator and configured to store said 3D signal coverage model for said pre-determined area, and also configured to store, for said unmanned aerial vehicle, a pre-determined flight path having pre-determined corridors on each side of said flight path and information associated with said flight path, wherein said information comprises location information related to waypoints lying within said corridors;
   a navigator cooperating with said repository to receive said stored flight path and said stored 3D coverage model, and configured to navigate said unmanned aerial vehicle to follow said stored flight path,
      wherein, if said signal coverage is lost while following said stored flight path, then said navigator searches for a node in said stored flight path that provides signal coverage, and if said node is found, then said unmanned aerial vehicle follows said stored flight path in an online mode, wherein in said online mode a sequence of signal strength measurements are used along with a digital terrain model (DTM) and location of radio signal transmitters to model and predict signal propagation losses more precisely,
      wherein, if said signal coverage is lost from said node, then said navigator is configured to switch said unmanned aerial vehicle to an offline mode from said online mode to carry out 3D path planning and signal prediction based on said 3D model and to use coverage skimming, wherein said offline mode uses only said DTM and said location of radio signal transmitters to model and predict said signal propagation losses, and
      wherein said navigator further checks for the signal from said node in the offline mode, and, if said signal from said node is found, then said navigator is configured to switch said unmanned aerial vehicle back to said online mode from said offline mode, and said unmanned aerial vehicle follows said stored flight path, and, if said signal from said node is not found, then said navigator is configured to return said unmanned aerial vehicle to a location that received said signal from said node in said online mode and continues to search for said signal from said node;

a waypoint identifier cooperating with said navigator and configured to identify waypoints present in the followed flight path, wherein the identified waypoints include suitable waypoints and guiding waypoints;

a waypoint selector cooperating with said waypoint identifier and configured to select the suitable waypoints from the identified waypoints;

a data collector cooperating with said waypoint selector and said unmanned aerial vehicle, and configured to collect data from said selected suitable waypoints present in said flight path;

a location identifier cooperating with said navigator and said repository and configured to identify location of said unmanned aerial vehicle and determine nodes present at pre-determined distance from said unmanned aerial vehicle based on stored 3D signal coverage model and stored approximate signal strengths;

a signal strength detector cooperating with said location identifier and configured to detect actual signal strengths of said determined nodes;

a node selector cooperating with the location identifier, and the signal strength detector to receive detected actual signal strengths of said determined nodes, and configured to select from said determined nodes, a suitable node based on corresponding signal strength; and a communicator cooperating with said data collector to receive said collected data from the suitable waypoints and configured to transmit the collected data to said suitable node through said unmanned aerial vehicle thereby providing robust communication.

2. The system as claimed in claim 1, wherein said signal coverage model creator further comprising:

a 3D grid creator configured to create a 3D grid based on predetermined set of rules and covering said pre-determined area;

a node identifier cooperating with said plurality of nodes and said 3D grid creator and configured to identify immediate neighbor nodes of each of plurality of nodes present in the area covered by said 3D grid to obtain location information of the immediate neighbor nodes;

an interpolator cooperating with said node identifier to receive the location information of said identified immediate neighbor nodes and configured to identify distance between said immediate neighbor nodes to interpolate approximate signal strength of said identified nodes based on the identified distance; and a model creator cooperating with said node identifier and said interpolator and configured to create a 3D signal coverage model including location information and approximate signal strength of said identified nodes.

3. The system as claimed in claim 1, wherein said pre-determined corridors impose constraints on said flight path such that unmanned aerial vehicles fly within said corridors.

4. The system as claimed in claim 1, wherein said data collector is adapted to be mounted on the unmanned aerial vehicle.

5. The system as claimed in claim 1, wherein said suitable waypoints are configured to store sensed data including images related to entities.

6. The system as claimed in claim 1, wherein said guiding waypoints are configured to guide said unmanned aerial vehicle.

7. The system as claimed in claim 1, wherein said suitable node is the determined node having maximum signal strength.

8. A computer implemented method for providing robust communication links to unmanned aerial vehicles, said method comprising the following:

creating a 3D model determining signal coverage provided by a plurality of nodes in a pre-determined area;

storing said 3D signal coverage model for said pre-determined area, and also storing, for an unmanned aerial vehicle, a pre-determined flight path having pre-determined corridors on each side of said flight path and information associated with said flight path, wherein said information comprises location information related to waypoints lying within said corridors and signal strengths of said waypoints;

navigating said unmanned aerial vehicle to follow said stored flight path, wherein, if said signal coverage is lost while following said stored flight path, then said unmanned aerial vehicle searches for a node in said stored flight path that provides signal coverage, and if said node is found, then said unmanned aerial vehicle follows said stored flight path in an online mode, wherein in said online mode a sequence of signal strength measurements are used along with a digital terrain model (DTM) and location of radio signal transmitters to model and predict signal propagation losses more precisely, wherein, if said signal coverage is lost from said node, then said unmanned aerial vehicle switches to an offline mode from said online mode to carry out 3D path planning and signal prediction based on said 3D model and to use coverage skimming, wherein said offline mode uses only said DTM and said location of radio signal transmitters to model and predict said signal propagation losses, and wherein said unmanned aerial vehicle further checks for the signal from said node in the offline mode, and, if said signal from said node is found, then said unmanned aerial vehicle switches back to said online mode from said offline mode and follows said stored flight path, and, if said signal from said node is not found, then said unmanned aerial vehicle returns to a location that received said signal from said node in said online mode and continues to search for said signal from said node;

identifying waypoints present in the followed flight path, wherein the identified waypoints include suitable waypoints and guiding waypoints;

selecting suitable waypoints from the identified waypoints;

collecting data from said selected suitable waypoints present in said flight path;

identifying location of said unmanned aerial vehicle and determining nodes present at pre-determined distance from said unmanned aerial vehicle based on stored 3D signal coverage model and stored approximate signal strengths;

detecting actual signal strengths of said determined nodes;

selecting, from said determined nodes, a suitable node based on corresponding signal strength; and transmitting the collected data to said suitable node through said unmanned aerial vehicle thereby providing robust communication.

9. The method as claimed in claim 8, wherein said step of creating a 3D model further comprises the following:
  creating a 3D grid covering said pre-determined area based on predetermined set of rules;
  identifying immediate neighbor nodes of each of plurality of nodes present in the area covered by created 3D grid and obtaining location information of the immediate neighbor nodes;
  identifying distance between said identified immediate neighbor nodes and interpolating approximate signal strength of said identified nodes based on the identified distance; and
  creating a 3D signal coverage model including location information and approximate signal strength of said identified nodes.

10. The method as claimed in claim 8, wherein said pre-determined corridors impose constraints on said flight path such that unmanned aerial vehicles fly within said corridors.

11. The method as claimed in claim 8, wherein said suitable waypoints are configured to store sensed data including images related to entities.

12. The method as claimed in claim 8, wherein said guiding waypoints are configured to guide said unmanned aerial vehicle.

13. The method as claimed in claim 8, wherein said step of selecting a suitable node includes step of selecting said determined node having maximum signal strength.

14. A non-transitory computer-readable medium having embodied thereon a computer program for providing robust communication links to unmanned aerial vehicles, that when executed by a processor performs the following steps:
  creating a 3D model determining signal coverage provided by a plurality of nodes in a pre-determined area;
  storing said 3D signal coverage model for said pre-determined area, and also storing, for an unmanned aerial vehicle, a pre-determined flight path having pre-determined corridors on each side of said flight path and information associated with said flight path, wherein said information comprises location information related to waypoints lying within said corridors and signal strengths of said waypoints;
  navigating said unmanned aerial vehicle to follow said stored flight path,
  wherein, if said signal coverage is lost while following said stored flight path, then said unmanned aerial vehicle searches for a node in said stored flight path that provides signal coverage, and if said node is found, then said unmanned aerial vehicle follows said stored flight path in an online mode, wherein in said online mode a where sequence of signal strength measurements are used along with a digital terrain model (DTM) and location of radio signal transmitters to model and predict signal propagation losses more precisely,
  wherein, if said signal coverage is lost from said node, then said unmanned aerial vehicle switches to an offline mode from said online mode to carryout 3D path planning and signal prediction based on said 3D model and to use coverage skimming, wherein said offline mode uses only said DTM and said location of radio signal transmitters to model and predict said signal propagation losses, and
  wherein said unmanned aerial vehicle further checks for the signal from said node in the offline mode, and, if said signal from said node is found, then said unmanned aerial vehicle switches back to said online mode from said offline mode and follows said stored flight path, and, if said signal from said node is not found, then said unmanned aerial vehicle returns to a location that received said signal from said node in said online mode and continues to search for said signal from said node;
identifying waypoints present in the followed flight path, wherein the identified waypoints include suitable waypoints and guiding waypoints;
selecting suitable waypoints from the identified waypoints;
collecting data from said selected suitable waypoints present in said flight path;
identifying location of said unmanned aerial vehicle and determining nodes present at pre-determined distance from said unmanned aerial vehicle based on stored 3D signal coverage model and stored approximate signal strengths;
detecting actual signal strengths of said determined nodes;
selecting, from said determined nodes, a suitable node based on corresponding signal strength; and transmitting the collected data to said suitable node through said unmanned aerial vehicle thereby providing robust communication.

* * * * *